(12) United States Patent
Song et al.

(10) Patent No.: US 8,761,529 B2
(45) Date of Patent: Jun. 24, 2014

(54) APPARATUS AND METHOD FOR PARALLEL ENCODING AND DECODING IMAGE DATA BASED ON CORRELATION OF MACROBLOCKS

(75) Inventors: Joon Ho Song, Gyeonggi-do (KR); Shi Hwa Lee, Seoul (KR); Do Hyung Kim, Gyeonggi-do (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 441 days.

(21) Appl. No.: 13/067,554

(22) Filed: Jun. 8, 2011

(65) Prior Publication Data

US 2011/0305400 A1    Dec. 15, 2011

(30) Foreign Application Priority Data

Jun. 9, 2010   (KR) .................. 10-2010-0054297

(51) Int. Cl.
   *G06K 9/36*    (2006.01)
(52) U.S. Cl.
   USPC .......................................................... 382/234
(58) Field of Classification Search
   USPC ............. 382/233, 234, 302, 304; 375/240.24, 375/240.25
   See application file for complete search history.

(56) References Cited

U.S. PATENT DOCUMENTS

| | | | |
|---|---|---|---|
| 6,477,281 B2 * | 11/2002 | Mita et al. | 382/248 |
| 2007/0098276 A1 * | 5/2007 | Reese | 382/234 |
| 2007/0189618 A1 * | 8/2007 | Bivolarski et al. | 382/234 |
| 2009/0245664 A1 * | 10/2009 | Matsumoto et al. | 382/234 |

FOREIGN PATENT DOCUMENTS

| | | |
|---|---|---|
| JP | 2008-067026 | 3/2005 |
| JP | 2006-345157 | 12/2006 |
| JP | 2008-035029 | 2/2008 |
| JP | 2008-283612 | 11/2008 |
| JP | 2009-239565 | 10/2009 |
| KR | 10-2010-0019717 | 2/2010 |
| KR | 10-0942700 | 2/2010 |

* cited by examiner

*Primary Examiner* — Phuoc Tran
(74) *Attorney, Agent, or Firm* — Staas & Halsey LLP (57) ABSTRACT

An apparatus and method provide parallel encoding and decoding of image data based on correlation of macroblocks. To encode and decode image data having a high resolution, an encoding order may be determined based on a correlation between blocks of the image data, and a decoding order may be determined based on the determined encoding order, thereby efficiently processing the blocks in parallel.

11 Claims, 6 Drawing Sheets

FIG. 1

IMAGE DATA PROCESSING APPARATUS 100

APPARATUS AND METHOD FOR PARALLEL ENCODING AND DECODING IMAGE DATA BASED ON CORRELATION OF MACROBLOCKS

CROSS-REFERENCE TO RELATED APPLICATIONS

This application claims the benefit of Korean Patent Application No. 10-2010-0054297, filed on Jun. 9, 2010, in the Korean Intellectual Property Office, the disclosure of which is incorporated herein by reference.

BACKGROUND

1. Field

One or more embodiments relate to an image data processing apparatus and method that may determine, based on a correlation of macroblocks (hereinafter, referred to as blocks) of the image data, an encoding order of image data having a high resolution, and may determine, based on the determined encoding order, a decoding order of the image data, so that the blocks may be efficiently processed in parallel during encoding or decoding of the image data.

2. Description of the Related Art

With developments in network and display technologies, schemes for encoding and decoding of moving images with higher resolution are in demand.

There is a demand for schemes of parallel encoding and decoding a moving image with a high resolution using a plurality of parallel calculation apparatuses. To increase an efficiency of encoding moving image information, information regarding blocks neighboring a current block is generally used. Accordingly, the current block may be encoded and decoded after the neighboring blocks are completely encoded and decoded. In other words, it is impossible to simultaneously encode and decode a plurality of blocks.

Typically, to encode and decode the current block, data of a block that is completely encoded and decoded in advance may be used, among a left block, an upper left block, an upper block, and an upper right block that enclose the current block.

Accordingly, diagonally arranged blocks may be processed in parallel. However, since encoding may be performed in an order from blocks in an uppermost column to blocks on a lowermost column, an encoding pattern may be inconsistent with a parallel processing pattern.

Conventionally, to encode an image, a variable-length encoding and decoding process based on a regular size may be performed, and remaining blocks may then be processed in parallel. Here, memory utilization may be excessively increased, since a large amount of data stored in a memory is again loaded and used. Additionally, system performance may be reduced due to the additional operations for storing and loading a large amount of data.

SUMMARY

The foregoing described problems may be overcome and/or other aspects may be achieved by an image data processing apparatus, which includes an encoding processing unit to determine at least one candidate block set including at least one candidate block among a plurality of blocks of image data, to encode the determined at least one candidate block set, and to determine an encoding order of the at least one candidate block, each candidate block in the at least one candidate block having no correlation with other candidate blocks included in the at least one candidate block.

In another aspect, an image data processing apparatus, includes a correlation verification unit to verify a correlation of a plurality of blocks of input image data, based on characteristics of the input image data; and an encoding processing unit to determine an encoding order of the plurality of blocks based on the verified correlation, and to encode the plurality of blocks in the determined encoding order.

In another aspect, an image data processing method, includes determining at least one candidate block set including at least one candidate block among a plurality of blocks of image data, each candidate block included in the at least one candidate block having no correlation with other candidate blocks included in the at least one candidate block and being parallel processed; generating input data, for use in an input of the at least one candidate block; encoding the at least one candidate block; determining, based on a correlation of the encoded at least one candidate block, whether the encoded at least one candidate block is able to be parallel processed; and determining an encoding order of the at least one candidate block based on whether the encoded at least one candidate block is able to be parallel processed.

Additional aspects, features, and/or advantages of embodiments will be set forth in part in the description which follows and, in part, will be apparent from the description, or may be learned by practice of the disclosure.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION

Reference will now be made in detail to one or more embodiments, examples of which are illustrated in the accompanying drawings, wherein like reference numerals refer to like elements throughout. In this regard, embodiments of the present invention may be embodied in many different forms and should not be construed as being limited to embodiments set forth herein. Accordingly, embodiments are merely described below, by referring to the figures, to explain aspects of the present invention.

Figure 1:
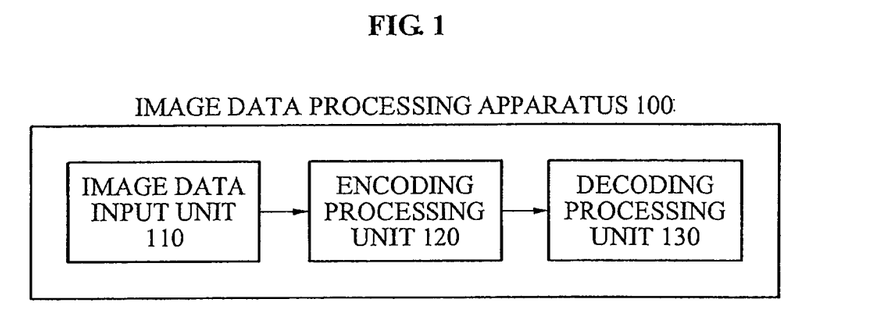
FIG. 1 is a block diagram of an image data processing apparatus according to embodiments.

FIG. 1 is a block diagram of an image data processing apparatus 100 according to embodiments. The image data processing apparatus 100 of FIG. 1 may include an image data input unit 110, an encoding processing unit 120, and a decoding processing unit 130.

The encoding processing unit 120 and the decoding processing unit 130 may be individually configured with independent hardware. The image data input unit 110 may divide input image data into a plurality of blocks. To efficiently encode and decode image data having a high resolution, the image data input unit 110 may divide the image data into a plurality of blocks. The dividing operation is well known in the art, and thus will not be described in detail herein.

The encoding processing unit 120 may determine at least one candidate block set that includes at least one candidate block having no correlation with other candidate blocks of the at least one candidate block among the plurality of blocks, and may encode the determined at least one candidate block set.

Information regarding correlation of the image data may be verified based on a type or characteristics of initial image data.

For example, in general image data having '6×4' blocks, a left block, an upper left block, an upper block, and an upper right block among blocks neighboring a predetermined block, may have a correlation with the predetermined block. Additionally, in an H 0.264 intra prediction vertical mode, only blocks located on a left side of a predetermined block may correlate with each other. Accordingly, a correlation between blocks of image data may be verified in advance.

The at least one candidate block set may be obtained by grouping the plurality of blocks into which the image data is divided, and may be interpreted as a set of at least one candidate block that is able to be parallel encoded. For example, when it is possible to parallel encode a second block, a third block, and a fourth block after a first block is encoded, a candidate block set including the first block may also include the second block, the third block, and the fourth block.

The encoding processing unit 120 may encode the second block, the third block, and the fourth block, and may determine an encoding order of the second block, the third block, and the fourth block based on the correlation. The determined encoding order may be used to determine a decoding order when the decoding processing unit 130 performs decoding. In other words, the encoding processing unit 120 may determine an encoding order of the at least one candidate block included in the encoded candidate block set.

According to an embodiment, the encoding processing unit 120 may determine the encoding order using the following two schemes. First, the encoding processing unit 120 may determine the encoding order based on a pattern that is determined in advance for each of the blocks, when all of the plurality of blocks of the image data have an identical correlation, namely, a fixed correlation.

Figure 3:
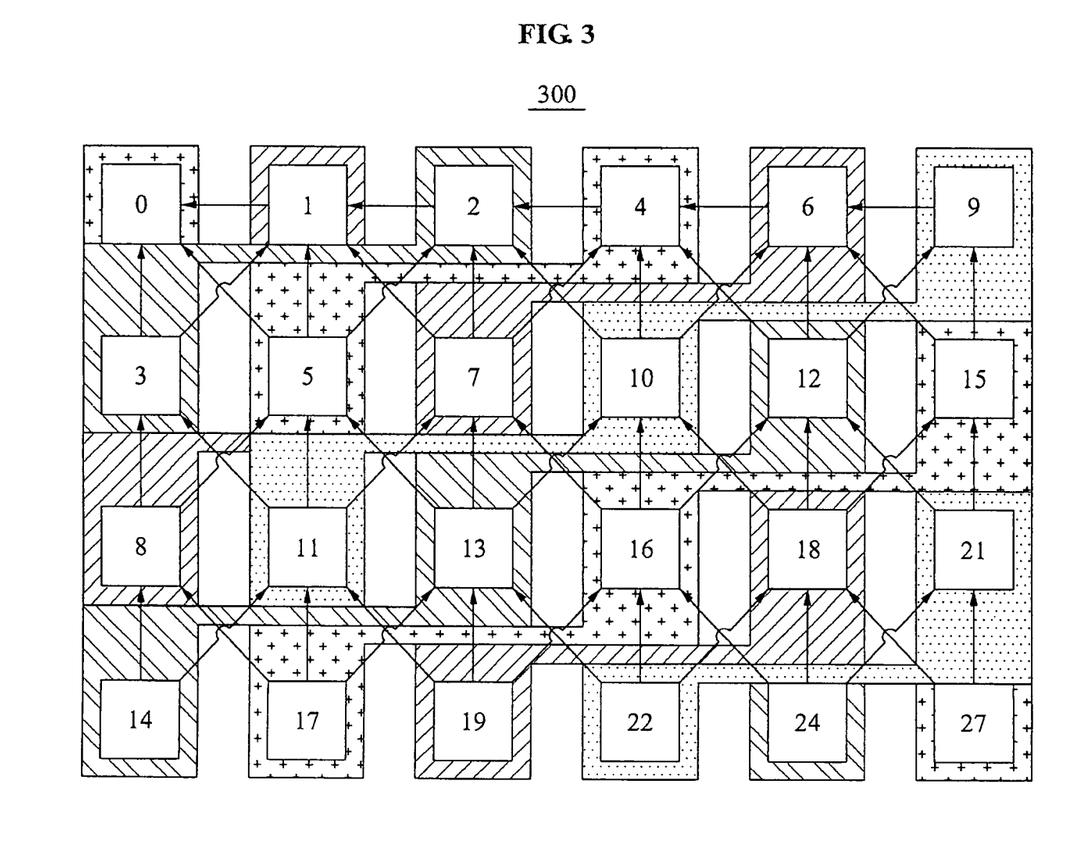
FIGS. 3 and 4 are diagrams illustrating examples of image data divided into blocks according to embodiments.

A first scheme of determining the encoding order based on the pattern will be further described with reference to FIG. 3. Referring to FIG. 3, image data 300 may be divided into '6×4' blocks. To encode and decode the image data 300 including the '6×4' blocks, an encoding order of the '6×4' blocks may be determined.

Specifically, it is assumed that information regarding a left block, an upper left block, an upper block, and an upper right block that are adjacent a predetermined block may be typically used to encode and decode a moving image, however, there is no limitation an the specific block information used. Accordingly, neighboring block information may be used to determine the encoding order in a different manner from that described with reference to FIG. 3.

Referring to FIG. 3, numerals indicate an encoding order of the blocks, and arrows indicate correlations among the blocks during encoding and decoding of each of the blocks. Additionally, different shading patterns used in FIG. 3 indicate different groups of parallel processable blocks. For example, a group of blocks 2 and 3, a group of blocks 4 and 5, and a group of blocks 6 and 7 may be parallel processed. In other words, since a correlation does not exist between the blocks 2 and 3, the blocks 2 and 3 may be parallel processed.

Accordingly, the encoding order of the blocks of the image data 300 may be determined in advance, and may be encoded and decoded, when each of the blocks has an identical correlation with neighboring blocks. Here, since the block 2 correlates with the block 1, and the block 3 correlates with the blocks 0 and 1, the blocks 2 and 3 may be parallel processed. In other words, the blocks 2 and 3 correlate with only the blocks 0 and 1 that are already decoded, and do not correlate with each other. Thus, the blocks 2 and 3 may be parallel processed.

For example, when the blocks have different correlations, the encoding processing unit 120 may decode in parallel the blocks by reflecting the encoding order on a decoding order. In this example, the encoding processing unit 120 may use the encoding order to encode the blocks having different correlations. Here, the encoding processing unit 120 may parallel encode blocks having a relatively low mutual correlation, to increase a system performance and a memory efficiency.

To use the encoding order to encode blocks having different correlations, the encoding processing unit 120 may include the following elements. Specifically, an image data processing apparatus according to an embodiment may include an image data input unit to divide input image data into a plurality of blocks, a correlation verification unit to verify a correlation of the plurality of blocks based on characteristics of the input image data, and an encoding processing unit to determine an encoding order of the plurality of blocks based on the verified correlation and to encode the plurality of blocks in the determined encoding order. Additionally, the image data processing apparatus may further include a decoding processing unit to determine a decoding order of the plurality of blocks, and to decode the plurality of blocks in the determined decoding order. Here, the decoding order may be determined based on the determined encoding order.

Referring back to FIG. 1, when the plurality of blocks have different correlations, the encoding processing unit 120 may adaptively determine the encoding order, rather than determine the encoding order based on the pattern that is determined in advance for each of the blocks.

Figure 2:
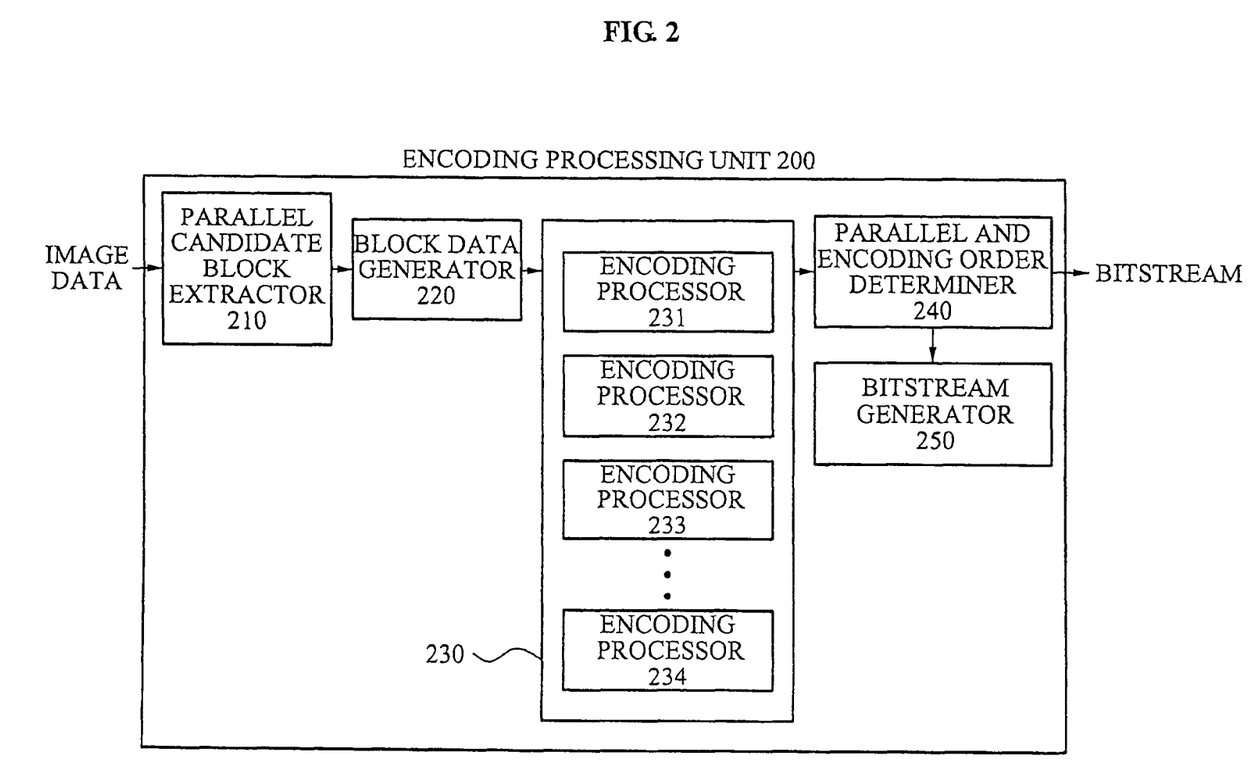
FIG. 2 is a block diagram of an encoding processing unit according to embodiments.

Hereinafter, a second scheme of adaptively determining the encoding order will be further described with reference to FIGS. 2 and 4. FIG. 2 illustrates a block diagram of an encoding processing unit 200 according to embodiments. Referring to FIG. 2, the encoding processing unit 200 may include a parallel candidate block extractor 210, a block data generator 220, a block encoder 230, and a parallel and encoding order determiner 240.

The parallel candidate block extractor 210 may determine at least one candidate block set including at least one candidate block among the plurality of blocks. Here, the at least one candidate block may be parallel processed, since a correlation does not exist between other candidate blocks of the at least one candidate block.

The block data generator 220 may generate input data that is used in an input of the at least one candidate block.

The block encoder 230 may encode the at least one candidate block. To simultaneously encode a plurality of blocks, the block encoder 230 may include a plurality of encoding processors 231 through 234.

The parallel and encoding order determiner 240 may determine, based on a correlation of the encoded at least one candidate block, whether the encoded at least one candidate block is able to be parallel processed. The parallel and encoding order determiner 240 may also determine an encoding order of the at least one candidate block based on whether the encoded at least one candidate block is able to be parallel processed.

When determining whether the encoded at least one candidate block is able to be parallel processed, the parallel and encoding order determiner 240 may store a motion vector of a corresponding candidate block, and a syntax of an encoded block bitstream such as a transform coefficient. Additionally, the parallel and encoding order determiner 240 may further store information regarding a location of each block arranged in an image based on the determined encoding order, and information regarding whether each block is able to be parallel decoded.

The encoding processing unit 200 may further include a bitstream generator 250 to generate a bitstream. Specifically, the bitstream generator 250 may add a flag to the encoded at least one candidate block, and may generate a bitstream using the at least one candidate block to which the flag is added. Here, the flag may reflect the determined encoding order. The bitstream generator 250 may generate a bitstream using only parallel decodable blocks based on the encoding order. Additionally, the bitstream generator 250 may generate a bitstream using the remaining blocks and next candidate blocks, or using all candidate blocks.

Additionally, the image data processing apparatus according to an embodiment may further include a decoding processing unit to verify the flag added to the bitstream, to verify the encoding order of the at least one candidate block, and to determine a decoding order based on the verified encoding order.

The encoding processing unit according to an embodiment may encode the plurality of blocks, into which the image data is divided, in the determined encoding order, when the plurality of blocks have an identical correlation based on characteristics of the divided image data.

The second scheme of adaptively determining an encoding order for image data where blocks have different correlations will be further described with reference to FIG. 4. FIG. 4 illustrates an example where a block encoding order is dynamically changed based on a dynamic change in correlation between blocks into which image data 410 and 420 is divided, during encoding of the image data 410 and 420. Here, the correlation may be dynamically changed based on a change in a mode determined in the encoding. For example, in an H.264 intra prediction vertical mode, only blocks located in a left side of a predetermined block may correlate with each other. Blocks 2, 3, and 5 in the image data 410 of FIG. 4 may be simultaneously decoded and accordingly, a high parallel processing possibility may exist compared with when the encoding order is changed as shown in the image data 420.

Figure 4:
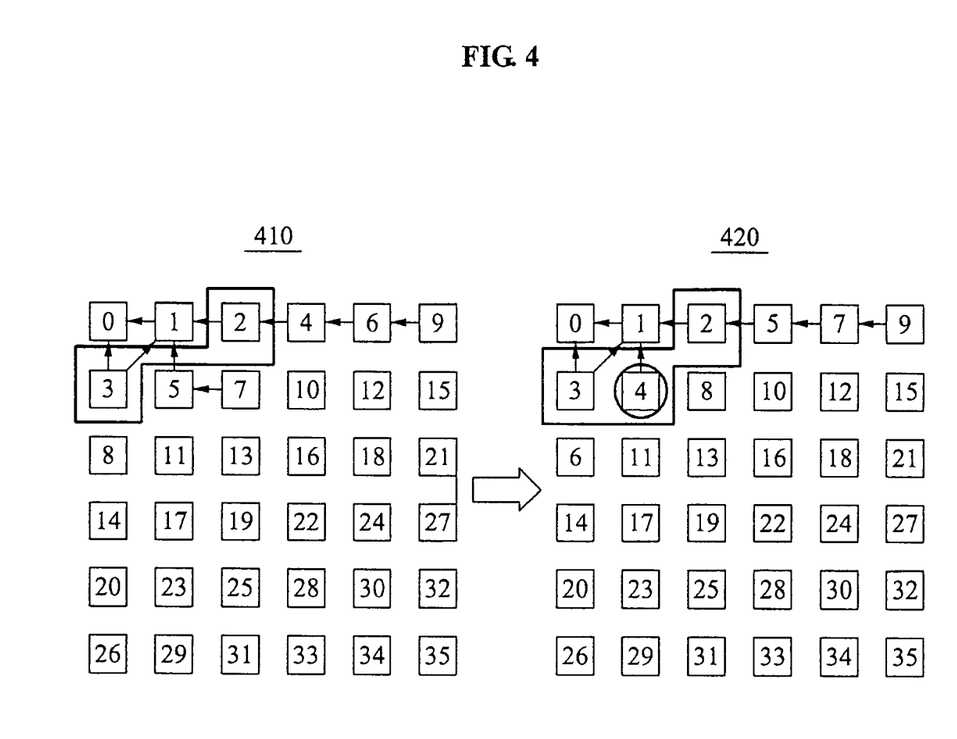

Referring to FIG. 4, numerals indicate an encoding order of the blocks, and arrows indicate correlations among the blocks during encoding and decoding of each of the blocks, in the same manner as shown in FIG. 3. Specifically, referring to the image data 410 of FIG. 4, when encoding of a block 0 is completed, blocks 1, 3 and 5 may be expected to be parallel processed. In other words, since a mutual correlation does not exist in the blocks 1, 3, and 5 as shown in the arrows of the image data 410, parallel processing may be expected. When the encoding of the block 0 is completed, a parallel candidate block extractor according to an embodiment may determine the blocks 1, 3, and 5 as candidate blocks, and may determine a first candidate block set including the blocks 1, 3, and 5. Subsequently, a block data generator according to an embodiment may generate input data for the candidate blocks, namely the blocks 1, 3, and 5, and may transfer the generated input data to three encoding processors based on a number of candidate blocks, so that the three encoding processors may encode the blocks 1, 3, and 5. Here, a plurality of encoding processors may be used to perform encoding, or a single block encoder may be used to sequentially perform encoding.

A result of encoding the blocks 1, 3, and 5 may indicate that the block 1 correlates with the block 0, the block 3 correlates with the blocks 0 and 1, and the block 5 correlates with the block 1, as shown in the image data 410 of FIG. 4. In other words, only the block 1 may be independently encoded, and the blocks 3 and 5 may have a correlation with the block 1.

Accordingly, a parallel and encoding order determiner according to an embodiment may determine the encoding order so that the block 1 may be encoded independently from the blocks 3 and 5 in the first candidate block set. Specifically, the parallel and encoding order determiner may determine, based on a correlation of encoded at least one candidate block in a candidate block set, whether the encoded at least one candidate block is able to be parallel processed, and may determine an encoding order of the at least one candidate block based on whether the encoded at least one candidate block is able to be parallel processed.

In other words, the parallel and encoding order determiner may determine the encoding order so that the blocks 0 and 1 may be sequentially encoded, and that the blocks 3 and 5 may be simultaneously encoded. As a result, the blocks 3 and 5 may be simultaneously decoded in a decoding order based on the encoding order determined by the parallel and encoding order determiner.

According to an embodiment, since a correlation between blocks of image data is not suddenly changed when considering characteristics of the image data, next input image data may be parallel encoded based on the determined encoding order. Accordingly, the encoding order determined by the parallel and encoding order determiner may be provided as feedback to an encoding processing unit, and may be used when the next input image data is encoded.

Subsequently, the parallel and encoding order determiner 240 may transfer only the block 1 together with a parallel flag to the bitstream generator 250, so that the bitstream generator 250 may generate a bitstream.

Additionally, the parallel candidate block extractor 210 may determine blocks 2 and 7 as candidate blocks, and may determine a second candidate block set used to determine a parallel processing possibility and an encoding order. The block 5 may have a correlation with the block 2 and thus, the correlation may be further used to encode the blocks 2 and 5.

A result of encoding the blocks may indicate that the block 2 correlates with the block 1, the block 5 correlates with the block 2, and the block 7 correlates with the block 5, as shown in the image data 420 of FIG. 4. Additionally, the encoded block 3 may correlate with the blocks 0 and 1.

Accordingly, the parallel candidate block extractor 210 may determine, as parallel processable blocks, the blocks 2, 3, and 5 that are already encoded, and may transfer the blocks 2, 3, and 5 together with parallel flags to the bitstream generator 250, so that the blocks 2, 3, and 5 may be sequentially encoded. Thus, the encoding order may be determined, as shown in the image data 420 of FIG. 4.

An encoding order of the remaining blocks may be determined based on the above-described principle and accordingly, the encoding order of all of the blocks may be determined.

The decoding processing unit 130 of FIG. 1 may determine a decoding order of at least one candidate block to correspond to the determined encoding order, and may decode the at least one candidate block in the determined decoding order. The decoding processing unit 130 will be further described with reference to FIG. 5.

Figure 5:
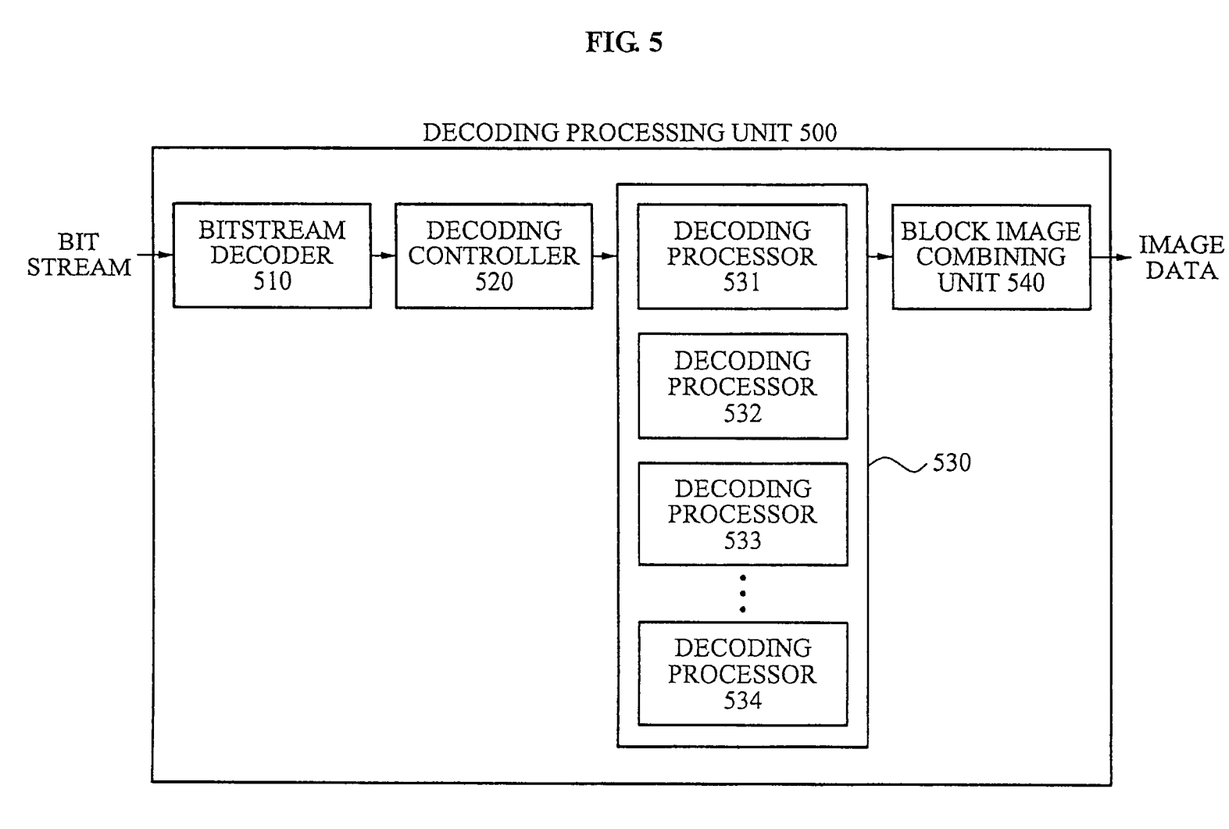
FIG. 5 is a block diagram of a decoding processing unit according to embodiments.

FIG. 5 illustrates a block diagram of a decoding processing unit 500 according to embodiments. The decoding processing unit 500 of FIG. 5 may include a bitstream decoder 510, a decoding controller 520, a block decoder 530, and a block image combining unit 540.

The bitstream decoder 510 may decode an input bitstream, and may transfer, to the decoding controller 520, decoded syntax information together with parallel flags.

The decoding controller 520 may sort out parallel processable blocks from the input bitstream, and may transfer the parallel processable blocks to the block decoder 530, so that block image data may be generated.

The block decoder 530 may include a plurality of decoding processors 531 through 534 to decode encoded blocks received from the decoding controller 520.

The block image combining unit 540 may combine block images based on locations of blocks decoded by the block decoder 530, and may output initial input image data.

According to various embodiments, an encoding order of blocks of image data may be determined based on a correlation between the blocks and thus, it is possible to parallel process the blocks during encoding and decoding of the image data.

Additionally, according to certain embodiment, blocks of image data may be encoded and decoded in parallel and thus, it is possible to reduce memory utilization, thereby improving the entire processing speed.

Figure 6:
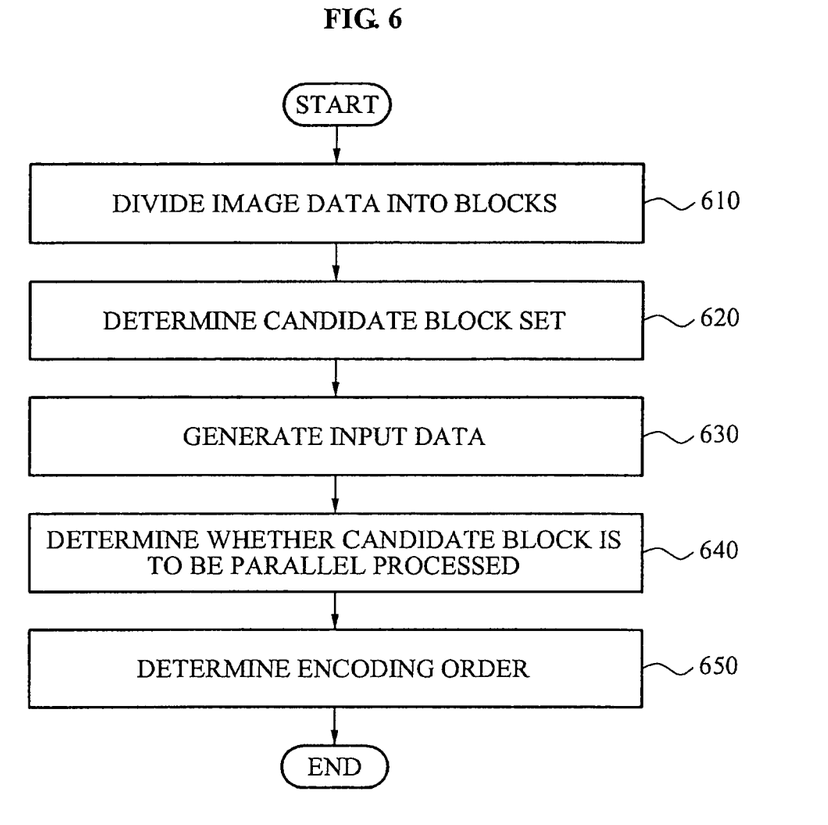
FIG. 6 is a flowchart of an image data processing method according to embodiments.

FIG. 6 illustrates a flowchart of an image data processing method according to various embodiments. Referring to FIG. 6, in operation 610, input image data may be divided into a plurality of blocks.

In operation 620, at least one candidate block set including at least one candidate block among the plurality of blocks, may be determined. Here, the at least one candidate block may be parallel processed, since a correlation does not exist between the at least one candidate block.

In operation 630, input data may be generated to be used in an input of the at least one candidate block, and the at least one candidate block may be encoded.

In operation 640, whether the encoded at least one candidate block is able to be parallel processed may be determined based on a correlation between the encoded at least one candidate block.

In an H.264 intra prediction vertical mode, information indicating whether it is possible to parallel process blocks (for example, a parallel flag), and information on a location of a current block may be transmitted to a decoder. For example, a conventional H.264 syntax may be used, and the information indicating whether blocks are able to be parallel processed may be transmitted to the decoder for each macroblock.

Here, a selected flag may indicate whether it is possible to parallel process a current macroblock and a previous macroblock for each transmission unit. Additionally, information on a location of the current macroblock together with information on an encoding order of macroblocks may be transmitted to the decoder.

Furthermore, the information on the encoding order and the information indicating whether it is possible to parallel process blocks may be transmitted to the decoder, using various schemes, for example a scheme of transmitting an index in a block order list that is set in advance, and of simultaneously encoding a group of parallel processable blocks.

In operation 650, an encoding order of the encoded at least one candidate block may be determined based on a result of operation 640.

Subsequently, in the image data processing method of FIG. 6, a decoding order of the at least one candidate block may be determined to correspond to the determined encoding order, and the at least one candidate block may be decoded in the determined decoding order.

The image data processing method of FIG. 6 may also include determining whether decoding of previous blocks is completed, to process the decoding. For example, when the previous blocks continue to be decoded, the determining may be continuously performed. When the decoding is determined to be completed, an input bitstream may be decoded, and information regarding a number of parallel decodable blocks, a motion vector, an encoded block bitstream syntax such as a transform coefficient, and information on locations on blocks in an image may be stored.

As described above, when the image data processing method of FIG. 6 is used, an encoding order of blocks of image data may be determined based on a correlation between the blocks, and the blocks may be parallel processed during encoding and decoding of the image data. Additionally, the blocks may be parallel encoded and decoded and thus, it is possible to reduce memory utilization, thereby improving the entire processing speed.

The image data processing method according to the above-described embodiments may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of the embodiments, or they may be of the kind well-known and available to those having skill in the computer software arts. Examples of non-transitory computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments, or vice versa.

According to certain embodiments, an encoding order of blocks of image data may be determined based on a correlation between the blocks and thus, it is possible to parallel process the blocks during encoding and decoding of the image data.

Additionally, according to one embodiment, blocks of image data may be encoded and decoded in parallel and thus, it is possible to reduce memory utilization, thereby improving the entire processing speed.

Although a few embodiments have been shown and described, it would be appreciated by those skilled in the art that changes may be made in these embodiments without departing from the principles and spirit of the disclosure, the scope of which is defined in the claims and their equivalents.

What is claimed is:
1. An image data processing apparatus, comprising:
an encoding processing unit comprising:
a parallel candidate block extractor to determine at least one candidate block set comprising at least one candidate block among a plurality of blocks of image data, each candidate block included in the at least one candi- date block set being expected to have no correlation with other candidate blocks included in the at least one candidate block set,
a block encoder to encode the determined at least one candidate block set, and
a parallel and encoding order determiner to adaptively determine an encoding order of the at least one candidate block in the at least one candidate block set based on a correlation of encoded at least one candidate block.

2. The image data processing apparatus of claim 1, further comprising:
a decoding processing unit to determine a decoding order of each candidate block included in the at least one candidate block, and to decode the at least one candidate block in the determined decoding order, the determined decoding order corresponding to the determined encoding order.

3. The image data processing apparatus of claim 1, wherein the encoding processing unit comprises:
a block data generator to generate input data, the input data being used in an input of the at least one candidate block;
wherein the parallel candidate block extractor to determine the at least one candidate block set comprising at least one candidate block among the plurality of blocks, each candidate block included in the at least one candidate block being parallel processed;
the parallel and encoding order determiner to determine, based on the correlation of the encoded at least one candidate block, whether the encoded at least one candidate block is able to be parallel processed, and to determine an encoding order of each candidate block included in the at least one candidate block based on whether the encoded at least one candidate block is able to be parallel processed.

4. The image data processing apparatus of claim 3, wherein the encoding processing unit further comprises a bitstream generator to add a flag to the encoded at least one candidate block, and to generate a bitstream using the at least one candidate block to which the flag is added, the flag reflecting the determined encoding order.

5. The image data processing apparatus of claim 4, further comprising:
a decoding processing unit to verify the flag and the encoding order, and to determine a decoding order based on the verified encoding order.

6. An image data processing apparatus, comprising:
a correlation verification unit to verify a correlation of a plurality of blocks of input image data, based on characteristics of the input image data; and
an encoding processing unit to adaptively determine an encoding order of the plurality of blocks based on the verified correlation, and to encode the plurality of blocks in the determined encoding order.

7. The image data processing apparatus of claim 6, further comprising:
a decoding processing unit to determine a decoding order of the plurality of blocks, and to decode the plurality of blocks in the determined decoding order, the determined decoding order corresponding to the determined encoding order.

8. The image data processing apparatus of claim 6, wherein the encoding processing unit encodes the plurality of blocks in the determined encoding order, when the plurality of blocks have an identical correlation based on the characteristics of the divided input image data.

9. An image data processing method, comprising:
determining at least one candidate block set comprising at least one candidate block among a plurality of blocks of image data, each candidate block included in the at least one candidate block set being expected to have no correlation with other candidate blocks included in the at least one candidate block set and being parallel processed;
generating input data for use in an input of the at least one candidate block;
encoding the at least one candidate block;
determining, based on a correlation of the encoded at least one candidate block, whether the encoded at least one candidate block is able to be parallel processed; and
determining, adaptively, an encoding order of the at least one candidate block based on whether the encoded at least one candidate block is able to be parallel processed.

10. The image data processing method of claim 9, further comprising:
determining a decoding order of the at least one candidate block, the determined decoding order corresponding to the determined encoding order; and
decoding the at least one candidate block in the determined decoding order.

11. The image data processing apparatus of claim 1, wherein a block encoding order is dynamically changed based on a dynamic change in correlation between blocks of the image data.

* * * * *